United States Patent
Fukushima

(10) Patent No.: US 8,169,876 B2
(45) Date of Patent: May 1, 2012

(54) OPTICAL INFORMATION RECORDING METHOD, OPTICAL INFORMATION REPRODUCING METHOD, OPTICAL INFORMATION RECORDING APPARATUS AND OPTICAL INFORMATION REPRODUCING APPARATUS

(75) Inventor: Yoshihito Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 12/112,539

(22) Filed: Apr. 30, 2008

(65) Prior Publication Data

US 2008/0285392 A1 Nov. 20, 2008

(30) Foreign Application Priority Data

May 15, 2007 (JP) ................................ 2007-129066

(51) Int. Cl.
*G11B 7/00* (2006.01)

(52) U.S. Cl. .............. 369/103; 369/112.01; 369/112.03; 369/112.05

(58) Field of Classification Search .................. 369/100, 369/103, 116, 44.11, 112.01, 112.03, 112.05, 369/112.23
See application file for complete search history.

(56) References Cited

U.S. PATENT DOCUMENTS

| | | | |
|---|---|---|---|
| 6,291,132 B1 * | 9/2001 | Glushko et al. | 430/270.15 |
| 6,590,852 B1 * | 7/2003 | McCormick, Jr. | 369/112.23 |
| 2005/0088947 A1 * | 4/2005 | Ichihara et al. | 369/103 |
| 2007/0054195 A1 * | 3/2007 | Usami | 430/2 |
| 2008/0137515 A1 * | 6/2008 | Morimoto | 369/112.01 |
| 2008/0273444 A1 * | 11/2008 | Ogasawara et al. | 369/103 |
| 2009/0245066 A1 * | 10/2009 | Katsuura et al. | 369/100 |

OTHER PUBLICATIONS

Edwin Walker et al., "3-D Parallel Readout in a 3-D Multilayer Optical Data Storage System", IEEE, 2002, pp. 147-149.*
Susanna Orlic et al., "Microholographic Data Storage", IEEE, 2003, pp. 744.*
Office Action issued Jan. 24, 2011, in Japanese Patent Application No. 2007-129066, filed May 15, 2007 (with English translation).

* cited by examiner

*Primary Examiner* — Thuy Pardo
(74) *Attorney, Agent, or Firm* — Oblon,Spivak, McClelland, Maier & Neustadt, L.L.P.

(57) ABSTRACT

An optical information recording method of recording information three-dimensionally by irradiating a laser light beam onto a medium having a servo information plane on which address information and/or servo information is recorded, is disclosed. The method includes the steps of: dividing a laser light beam from one laser light source into laser light beams, the beam including a first light beam for reading the information, and a second light beam for recording information onto the recording medium; irradiating the first light beam onto the servo information plane to read the information from reflected light of the first light beam to read the information in which optical axes of the first light beam and second light beam are arranged coaxially; and irradiating the second light beam based on the read information to be focused onto a position in a depth direction perpendicular to a horizontal direction of the recording medium.

13 Claims, 7 Drawing Sheets

F I G . 10
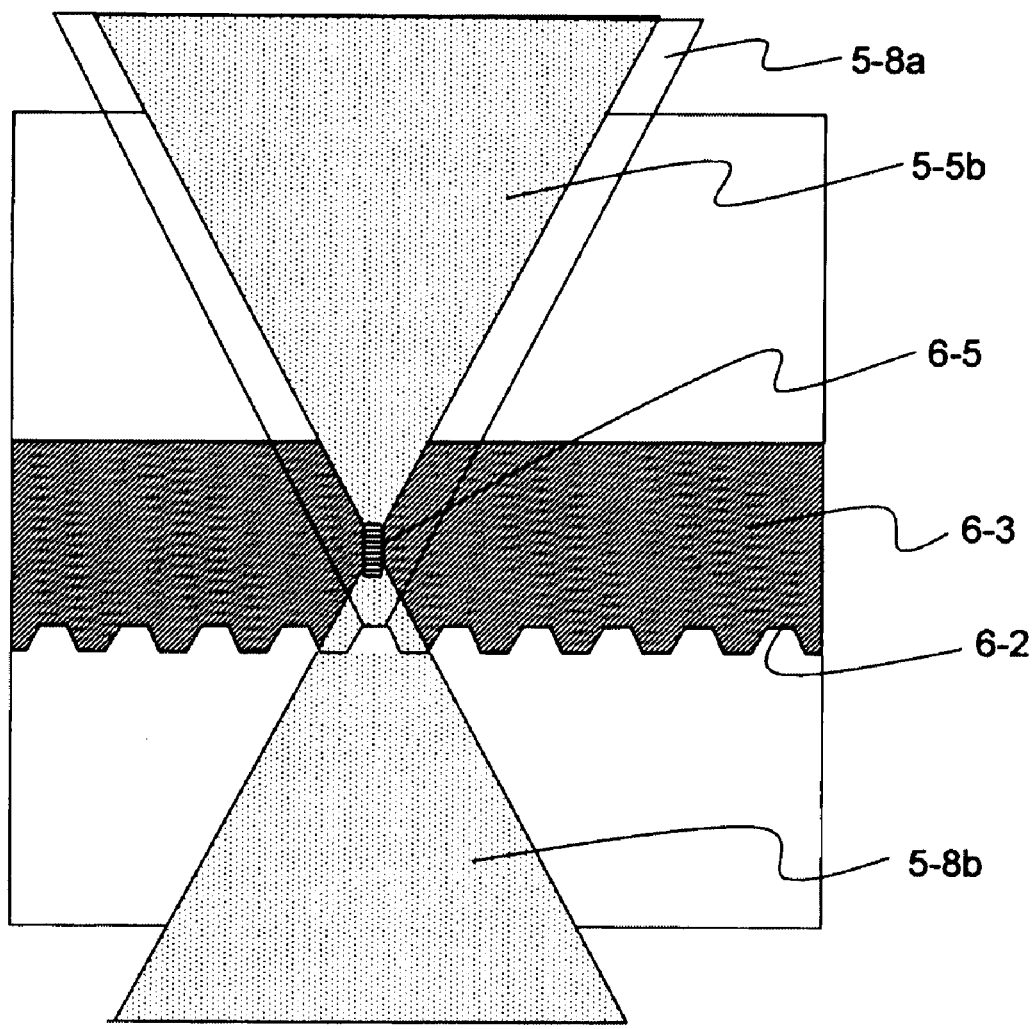

OPTICAL INFORMATION RECORDING METHOD, OPTICAL INFORMATION REPRODUCING METHOD, OPTICAL INFORMATION RECORDING APPARATUS AND OPTICAL INFORMATION REPRODUCING APPARATUS

CROSS-REFERENCE TO RELATED APPLICATIONS

The present application claims benefit of priority of Japanese patent Application No. 2007-129066 filed in the Japanese Patent Office on May 15, 2007, the entire disclosure of which is incorporated herein by reference.

BACKGROUND OF THE INVENTION

1. Field of the Invention

The present invention relates to an optical information recording method, an optical information reproducing method, an optical information recording apparatus and an optical information reproducing apparatus in which servo information of a recording medium is read to record or reproduce information.

2. Description of Related Art

With recent increase in information amount, for an optical disc, high-capacity recording media and high-capacity recording methods that exceed the capacity of Blu-ray Disc have been vigorously studied. One of them utilizes holographic technology.

In a holographic recording method, interference fringes at intervals of a wavelength of light or less are recorded on a recording medium as a physical property change, and during reproduction, diffracted light from interference fringes of reproduction light is read. For example, Japanese Patent No. 3693990 (hereinafter referred to as "Patent Document 1") discloses a technique in which a known holographic technology is applied to an optical disc recording technology. Two light sources of different wavelengths are used, one of which is used as a light source for recording information by hologram, and the other of which is used as a light source for servos.

The reason why the wavelength of the light source for servos is set to differ from that of the light source for hologram recording is not to form unnecessary interference fringes irrelevant to the recorded information within a recording layer. The wavelength of the light source for servos is thus required to be a wavelength that does not sensitize the hologram recording layer.

However, the provision of the two light sources of the different wavelengths within the optical information recording apparatus, not only results in cost disadvantage because of the necessity of two lasers, but also increases difficulty level in design because an optical system needs to correspond to the two wavelengths. Moreover, recording light reflects diffusely on a plane on which address information and/or servo information is recorded (servo information plane), which forms unnecessary interference fringes in the recording layer. In order to overcome the drawbacks, for example, Japanese Unexamined Patent Application Publication No. 2004-265472 (hereinafter referred to as "Patent Document 2") proposes that a filter layer is provided between a servo pit plane and a recording layer. The filter layer transmits a wavelength of a light source for servos and reflects a wavelength of a light source for recording. However, the provision of this layer in a recording medium increases the manufacturing steps of recording medium, which results in cost-up.

On the other hand, a volume recording method different from the known hologram method has been proposed. For example, there has been made an attempt to apply a technique of recording reflective microholograms in layers to an optical disc as disclosed in the U.S. Pat. No. 6,020,985 (hereinafter referred to as "Patent Document 3"). This is a method in which two opposed light beams are collected in the same position within a recording material to form interference fringes only in a minute region in the vicinity of a focal point, and during data reproduction, one light beam is collected so that the data reproduction is performed depending on the presence or absence of diffracted light from the interference fringes.

As in the case of the known hologram recording, to record complicated interference fringes in a thick direction of the recording material, deformation of the interference fringes caused by heat expansion or contraction, for example, has significant influence on data reproduction. In this respect, the microhologram in which the interference fringes are recorded by bit-by-bit only in the vicinity of the focal point has an advantage that an acceptable amount of deformation of the interference fringes is larger than that of the known volume hologram recording.

On the other hand, regarding the positioning accuracy of the light beam, the recorded interference fringes themselves are large in the known volume hologram recording, so that the positioning accuracy of a diffraction limit level of light is not required. Accordingly, there is actually no problem in using a laser of a longer wavelength for positioning than the wavelength of the light source for recording.

However, unlike the known volume hologram, in the case of the microhologram that performs by bit-by-bit recording in a size similar to the diffraction limit of light, the positioning control of a light beam needs to be performed with a proper accuracy. That is, it is substantially difficult to perform the servo operation with the laser of the longer wavelength than the wavelength of the light source for recording.

Besides the example of the above-described microhologram, for example, there has been proposed a method of forming a minute refractive index changing region of a size similar to the diffraction limit within a recording material to record information as disclosed in Japanese Unexamined Patent Application Publication No. 2005-37658 (hereinafter referred to as "Patent Document 4"). In the positioning control of the light beam in the method, an accuracy similar to the diffraction limit of a laser for recording is also required as in the microhologram.

SUMMARY OF THE INVENTION

The present invention addresses the above-described drawbacks in the developing technology. In an optical information recording method of recording information three-dimensionally in a recording medium, particularly an optical information recording method of recording information by bit-by-bit in a size similar to a diffraction limit of a laser for recording, it is desirable to provide an optical information recording method of performing secure positioning control of a light beam to perform stable recording without complicating a configurations of an optical system. It is also desirable to provide the recording medium and an optical information recording apparatus that performs the optical information recording method, and an optical information reproducing method of performing secure positioning control of a light beam to perform stable reproduction without complicating the configurations of the optical system and the recording medium and an optical information reproducing apparatus that performs the optical information reproducing method.

In accordance with a first aspect of the present invention, there is provided an optical information recording method of recording information three-dimensionally by irradiating a laser light beam onto a recording medium having a servo information plane on which address information and/or servo information is recorded, the method including the steps of: dividing a laser light beam from one laser light source into two ot more laser light beams, the laser light beam including a first light beam for reading the address information and/or the servo information, and a second light beam for recording information onto the recording medium; irradiating the first light beam onto the servo information plane to read the address information and/or servo information in which optical axes of the first and second light beams are arranged coaxially; and irradiating the second light beam based on the read address information and/or servo information to be focused onto a position in a depth direction perpendicular to a horizontal direction of the recording medium to perform the recording.

The polarized states of the first light beam and the second light beam may be perpendicular to each other.

Moreover, the recording may be performed by bit-by-bit. Preferably, planes, each of which is in the same depth position of the recording medium, are recording planes, and the recording planes are formed in layers in the depth direction of the recording medium to record the information three-dimensionally, and further, it is preferable that a distance between the servo information plane and a first recording plane adjacent to the servo information plane is not less than a distance between the first recording plane and a second recording plane adjacent to the first recording plane.

Moreover, an intensity of the first light beam may be a lowest of the divided laser light beams.

Furthermore, the address information and/or servo information may be recorded in embossed pits.

In accordance with a second aspect of the present invention, there is provided an optical information recording apparatus that records information three-dimensionally by irradiating a laser light beam onto a recording medium having a servo information plane on which address information and/or servo information is recorded, which includes one laser light source, a beam splitter for dividing a laser light beam from the laser light source into two or more laser light beams, a focal depth switching unit, a beam coaxially-arranging unit, an optical system, and a servo detector. The laser light beam includes a first light beam for retrieving the address information and/or the servo information, and a second light beam for recording information within the recording medium. The focal depth switching unit switches a focal depth of the second light beam. The beam coaxially-arranging unit arranges optical axes of the first light beam and the second light beam with the optical axes arranged coaxially to the recording medium. The optical system guides the first light beam and the second light beam with the optical axes arranged coaxially to the recording medium. The servo detector reads the address information and/or servo information form reflected light of the first light beam. The servo detector reads the address information and/or servo information from the reflected light of the first light beam irradiated onto the servo information plane. The focal depth switching unit switches the focal depth of the second light beam based on the read address information and/or servo information. The second light beam with the focal depth switched is subsequently irradiated so as to be focused onto a position in a depth direction perpendicular to a horizontal direction of the recording medium to perform the recording.

The beam divider may be a polarization beam splitter that divides the light beam so that polarized states of the first light beam and the second light beam are perpendicular to each other.

Moreover, the recording is preferably performed by bit-by-bit.

A recording plane which is a plane in the same depth position of the recording medium, may be formed in layered in the depth direction of the recording medium to record the information three-dimensionally. A distance between the servo information plane and a first recording plane (Plane A) adjacent to the servo information plane may be not less than a distance between the first recording plane (Plane A) and a second recording plane (Plane B) adjacent to the first recording plane.

Moreover, a servo branching optical system within an optical path of the first light beam may further be included. The servo branching optical system passes the first light beam without changing the polarized state, and emits reflected light of the incident light beam in a state deviated from an optical axis of the first light beam.

Moreover, intensity adjusting unit for adjusting the first light beam to the lowest intensity of the divided laser light beam may further be included.

The recording medium may have the servo information plane on which the address information and/or servo information is recorded in embossed pits.

In accordance with a third aspect of the present invention, there is provided an optical information reproducing method of reproducing recorded information by irradiating a laser light beam onto a recording medium on which the information is recorded three-dimensionally, the method including the steps of: dividing a laser light beam from one laser light source into two or more laser light beams, the laser light beams including a first light beam for reading address information and/or servo information, a third light beam for reproducing the information within the recording medium, then irradiating the first light beam onto the servo information plane in which optical axes of the first light beam and the third light beam are arranged coaxially to read the address information and/or the servo information from reflected light of the first light beam, and irradiating the third light beam based on the read address information and/or servo information so as to be focused onto a predetermined position in horizontal direction and in a depth direction of the recording medium to perform the reproduction of the information from reflected light of the third light beam.

In accordance with a forth aspect of the present invention, there is provided an optical information reproducing apparatus that reproduces recorded information by irradiating a laser light beam onto a recording medium on which the information is recorded three-dimensionally, which includes one laser light source, a beam divider for dividing a laser light beam from the laser light source into two or more laser light beams including a first light beam for retrieving address information and/or servo information, and a third light beam for reproducing the information within the recording medium, a focal depth switching unit for switching a focal depth of the third light beam, a beam coaxially-arranging unit for arranging optical axes of the third light beam coaxially, an optical system, a servo detector, and a reproduction detector. The optical system guides the first light beam and the third light beam with the optical axes arranged coaxially to the recording medium. The servo detector reads the address information and/or servo information from reflected light of the first light beam. The reproduction detector reproduces the information from reflected light of the third light beam. The servo detector reads the address information and/or servo information from the reflected light of the firth light beam irradiated onto the servo information plane. The focal depth switching unit switches the focal depth of the third light beam based on the read address information and/or servo information. The third light beam with the focal depth switched is subsequently irradiated so as to be focused onto a predetermined position in a horizontal direction and in a depth direction of the recording medium, whereby the reproduction detector reproduces the information from the reflected light of the third light beam.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 10 is an explanatory diagram showing how a light beam during recording is condensed in the recording medium of FIG. 9.

DETAILED DESCRIPTION OF EMBODIMENTS

Figure 1:
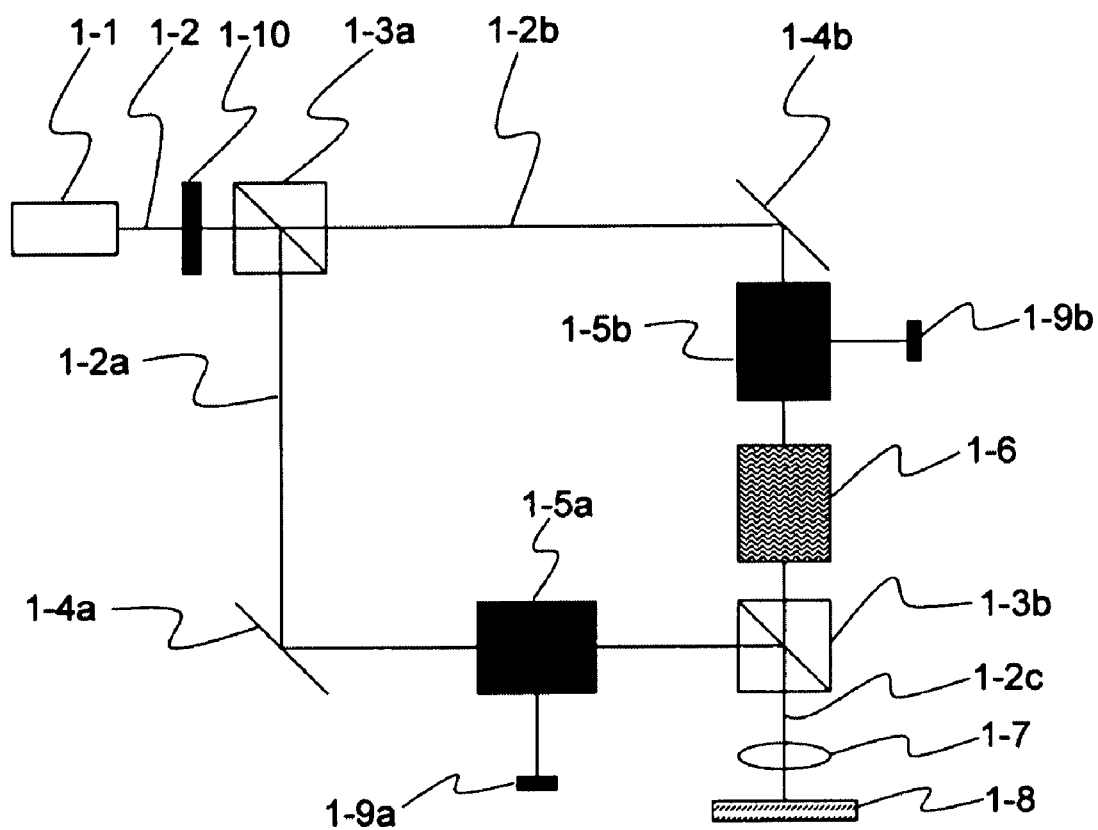
FIG. 1 is a block diagram showing an optical system in a first embodiment of an optical information recording apparatus (optical information reproducing apparatus) according to an embodiment of the present invention.

As a result of a keen examination for solving the above-described problems, the inventor has arrived at the following conclusion. That is, in an optical information recording apparatus (optical information recording method) that records information three-dimensionally within a recording medium, a light beam of one laser light source is divided into two or more, and at least one of the divided light beams is used for reading address information and/or servo information (first light beam), and at least one of the divided light beams is used for recording information within the recording medium (second light beam), by which light sources do not need to be provided separately for recording and for servo, and an optical system for servo can be the same as an optical system for recording, so that the positioning of the light during recording can be controlled at a diffraction limit level of light. Also, this is similarly obtained in an optical information reproducing apparatus (optical information reproducing method) that reproduces information recorded three-dimensionally in the recording medium.

Furthermore, the first light beam and the second light beam are arranged so that the polarized states are perpendicular to each other. Thus, even if the first light beam and the second light beam overlap each other within the recording medium by virtue of arranging the first and second light beams coaxially, the first light beam and the second light beam do not interfere with each other, which can prevent unnecessary interference fringes from being recorded within the recording material.

Moreover, when the information is recorded three-dimensionally by performing the recording by bit-by-bit in planes each of which is a plane in the same depth position of the recording medium, and the recording is performed in layers in a depth direction, if a distance d between the respective recording planes is the same, and a distance between a layer closest to a plane (servo information plane) for reading the address information and/or the servo information among these recording planes and the servo information plane is d$0$, d<d$0$ is set, by which the influence on the recorded information can be avoided even if change in physical properties of the recording material by condensing of the light beam for servo occurs. Also, the influence of the reflected light from the servo plane in the recording/reproduction can be suppressed.

Furthermore, the change in physical property of the recording material by the light beam for servo can be suppressed by setting an intensity of the light beam for servo to be the lowest among the divided light beams.

In light of the foregoing, the inventor has achieved the present invention.

According to an embodiment of the present invention, there is provided an optical information recording method of recording information three-dimensionally by irradiating a laser light beam onto a recording medium having a servo information plane on which address information and/or servo information is recorded, the method including the steps of: dividing a laser light beam from one laser light source into two or more laser light beams, the laser light beam including a first light beam for reading the address information and/or the servo information, and a second light beam for recording information onto the recording medium; irradiating the first light beam onto the servo information plane to read the address information and/or the servo information reflected light of the first light beam to read the address information and/or servo information in which optical axes of the first light beam and the second light beam are arranged coaxially; and irradiating the second light beam based on the read address information and/or servo information to be focused onto a position in a depth direction perpendicular to a horizontal direction of the recording medium to perform the recording.

According to another embodiment of the present invention, there is provided an optical information recording apparatus that records information three-dimensionally by irradiating a laser light beam onto a recording medium having a servo information plane on which address information and/or servo information is recorded, which includes one laser light source, a beam splitter for dividing a laser light beam from the laser light source into two or more laser light beams, a focal depth switching unit, a beam coaxially-arranging unit, an optical system, and a servo detector. The laser light beam includes a first light beam for retrieving the address information and/or the servo information, and a second light beam for recording information within the recording medium. The focal depth switching unit switches a focal depth of the second light beam. The beam coaxially-arranging unit arranges optical axes of the first light beam and the second light beam coaxially. The optical system guides the first light beam and the second light beam with the optical axes arranged coaxially to the recording medium. The servo detector reads the address information and/or servo information form reflected light of the first light beam. The servo detector reads the address information and/or servo information from the reflected light of the first light beam irradiated onto the servo information plane. The focal depth switching unit switches the focal depth of the second light beam based on the read address information and/or servo information. The second light beam with the focal depth switched is subsequently irradiated so as to be focused onto a position in a depth direction perpendicular to a horizontal direction of the recording medium to perform the recording.

According a still other embodiment of the present invention, there is provided an optical information reproducing method of reproducing recorded information by irradiating a laser light beam onto a recording medium on which the information is recorded three-dimensionally, the method including the steps of: dividing a laser light beam from one laser light source into two or more laser light beams, the laser light beams including a first light beam for reading address information and/or servo information, and a third light beam for reproducing the information within the recording medium; the irradiating first light beam onto the servo information plane in which optical axes of the first light beam and the thir light beam are arranged coaxially to read the address information and/or the servo information from reflected light of the first light beam; and irradiating the third light beam based on the read address information and/or servo information so as to be focus onto a predetermined position in a horizontal direction and in a depth direction of the recoding medium to perform the reproduction of the information from reflected light of the third light beam.

According to still other embodiment of the present invention, there is provided an optical information reproducing apparatus that reproduces recorded information by irradiating a laser light beam onto a recording medium on which the information is recorded three-dimensionally, which includes: one laser light source; a beam divider for dividing a laser light beam from the laser light source into two or more laser light beams including a first light beam for retrieving address information and/or servo information, and a third light beam for reproducing the information within the recording medium; a focal depth switching unit for switching a focal dept of the third light beam; a beam coaxially-arranging unit for arranging optical axes of the third light beam coaxially; an optical system to guide the first light beam and the third light beam with the optical axes arranged coaxially to the recording medium; a servo detector to read the address information and/or servo information from reflected light of the first light beam; and a reproduction detector to reproduce the information from reflected light of the third light beam. The servo detector reads the address information and/or servo information from the reflected light of the first light beam irradiated onto the servo information plane. The focal depth switching unit switches the focal depth of the third light beam based on the read address information and/or servo information. The third light beam with the focal depth switched is subsequently irradiated so as to be focused onto a predetermined position in a horizontal direction and in a depth direction of the recording medium, so that the reproduction detector reproduces the information from the reflected light of the third light beam.

Hereinafter, specific embodiments of the optical information recording method, optical information reproducing method, optical information recording apparatus, and optical information reproducing apparatus will be described. However, it is obvious that the present invention is not limited to these embodiments, but can be widely applied to an optical information recording method and an optical information recording apparatus, or optical information reproducing method and an optical information reproducing apparatus in which information is recording three-dimensionally within the optical recording medium and a light beam positioning accuracy of about a diffraction limit of the light beam for recording is required.

First Embodiment

A first embodiment of the optical information recording method and the optical information reproducing method according to an embodiment of the present invention will be described based on the optical information apparatus and the optical information reproducing apparatus according to an embodiment of the present invention. Here, while an optical information recording and reproducing apparatus combining respective requirements of both the optical information recording apparatus and the optical information reproducing apparatus will be described, the optical information recording and reproducing apparatus has a constitution suitable for providing the optical information recording method and the optical information reproducing method of an embodiment of the present invention.

FIG. 1 shows an optical system in the first embodiment of the optical information recording and reproducing apparatus in an embodiment of the present invention. In the figure, only a main optical block is illustrated.

As a reference character, 1-1 denotes a laser light source, and in an example described later, a semiconductor laser apparatus having a wavelength of 405 nm is used. Subsequently, a light beam 1-2 emitted from the laser light source 1-1 is separated by a polarization beam splitter 1-3a as one embodiment of the beam divider into S polarized light and P polarized light, which advance separately in two directions as a light beam 1-2a and a light beam 1-2b, respectively. Here, the light beam 1-2a is used as a light beam for servo and the light beam 1-2b is used as a light beam for recording/reproduction. Reference character 1-10 denotes a ½ wavelength plate as one aspect of the intensity adjusting unit, which adjusts an intensity ratio between the light beam for servo 1-2a and the light beam for recording/reproduction 1-2b.

(Servo-Side Optical System)

The light beam for servo 1-2a is reflected at a total reflection mirror 1-4a, passes through a branching optical system 1-5a as a servo branching optical system described later, passes through a polarization beam splitter 1-3b and an objective lens 1-7 as one embodiment of the beam coaxially-arranging unit, and is then collected onto a servo information plane of a recording medium 1-8. Subsequently, the light reflected from the servo information plane is reflected at the polarization beam splitter 1-3b, and then enters the branching optical system 1-5a again. This light beam exits in a state deviated from the original optical axis within the optical system, and is received by a detector for servo 1-9a as the servo detector.

(Recording/Reproduction-Side Optical System)

The light beam for recording/reproduction 1-2b is reflected by a total reflection mirror 1-4b, passes through a branching optical system 1-5b as a branching optical system for reproduction, and then passes through a focal depth switching optical system 1-6 as the focal depth switching unit. Thereafter, it passes through the polarization beam splitter 1-3b and the objective lens 1-7, and then is focused in a predetermined position in a depth direction different from that of the servo information plane within the recording medium. The forgoing is the same in both the recording and the reproduction.

During the recording, a minute refractive index change is produced in the recording material in this region where the light is collected to generate a recording mark.

During the reproduction, the reflected light from the recording mark (minute refractive index change region) in the recording material passes through the objective lens 1-7, the polarization beam splitter 1-3b and the focal depth switching optical system 1-6, and then enters the branching optical system 1-5b. The reflected light outgoes in a state deviated from the original optical axis within the branching optical system 1-5b which is the reproduction detector, and is received by a detector for signal 1-9b.

Since the light beam for servo 1-2a and the light beam for recording/reproduction 1-2b are positioned by the control of the same objective lens 1-7, optical axes of the two light beams are arranged coaxially after they go through the polarization beam splitter 1-3b.

The branching optical systems 1-5a, 1-5b will be described. The term "branching optical system" herein used refers to one that passes the light beam advancing in the direction entering the recording medium without changing the polarized state before and after the branching optical system, and deviates the light beam reflected from the recording medium from the optical axis of the incident light beam.

Figure 2:
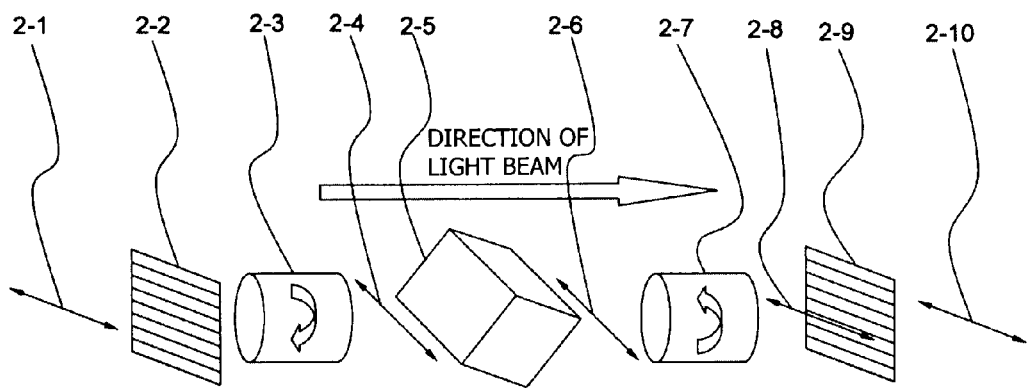
FIG. 2 is an explanatory diagram of an action of a branching optical system for a light beam advancing in a direction entering a recording medium.

FIG. 2 is an explanatory diagram of an action of the branching optical system for the light beam advancing in the direction entering the recording medium. The branching optical system is configured by arranging a polarizer 2-2, a Faraday rotator 2-3, a polarization beam splitter 2-5, a Faraday rotator 2-7, and a polarizer 2-9 in this order.

A light beam 2-1 entering the branching optical system passes through the polarizer 2-2, and then passes through the Faraday rotator 2-3 that rotates a polarization plane at 45 degrees. Subsequently, the passing light passes through the polarization beam splitter 2-5 arranged so as to transmit 100% in the direction of this polarization plane, and then, passes through the Faraday rotator 2-7 that rotates the polarization plane at 45 degrees in the reverse direction to that of the Faraday rotator 2-3, and passes through the polarizer 2-9, which performs polarization in the same direction as that of the polarizer 2-2. The light beam 2-10 transmitting in this manner has little energy loss and keeps the same polarized state as compared with the incident light 2-1.

Figure 3:
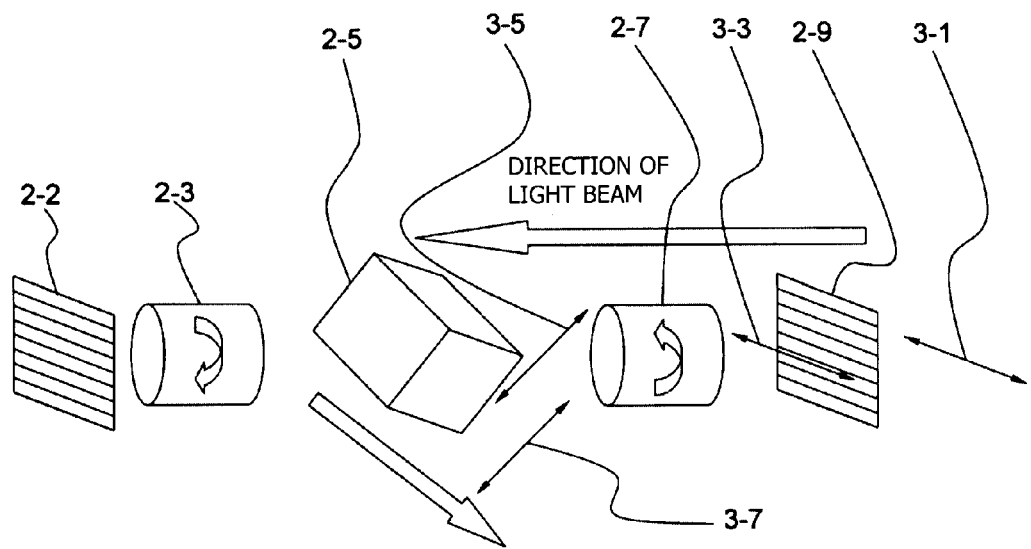
FIG. 3 is an explanatory diagram of an action of the branching optical system for a light beam reflected from the recording medium.

FIG. 3 is an explanatory diagram of an action of a branding optical system for the light reflected from the recording medium.

A light beam 3-1 reflected from the recording medium goes through the polarizer 2-9, and transmits the Faraday rotator 2-7 that rotates the polarization plane at 45 degrees. Since the polarization plane of a light beam 3-5 after polarization is perpendicular to the polarization plane of light beams 2-4, 2-6, the light beam is reflected by the polarization beam splitter 2-5. Reflected light 3-7 has little energy loss as compared with the incident light 3-1.

The use of the branching optical systems causes a drawback of not assembling the optical system in one place in FIG. 1. That is, the reflected light 3-7 outgoing from the polarization beam splitter shown in FIG. 3 is not on a plane determined by other light beams in FIG. 1 but is deviated in a direction of 45 degrees.

As one method to overcome the drawback, a method of incorporating the detector shown in FIG. 1 into the polarization beam splitter in FIG. 3 to integrate may be considered.

Figure 4:
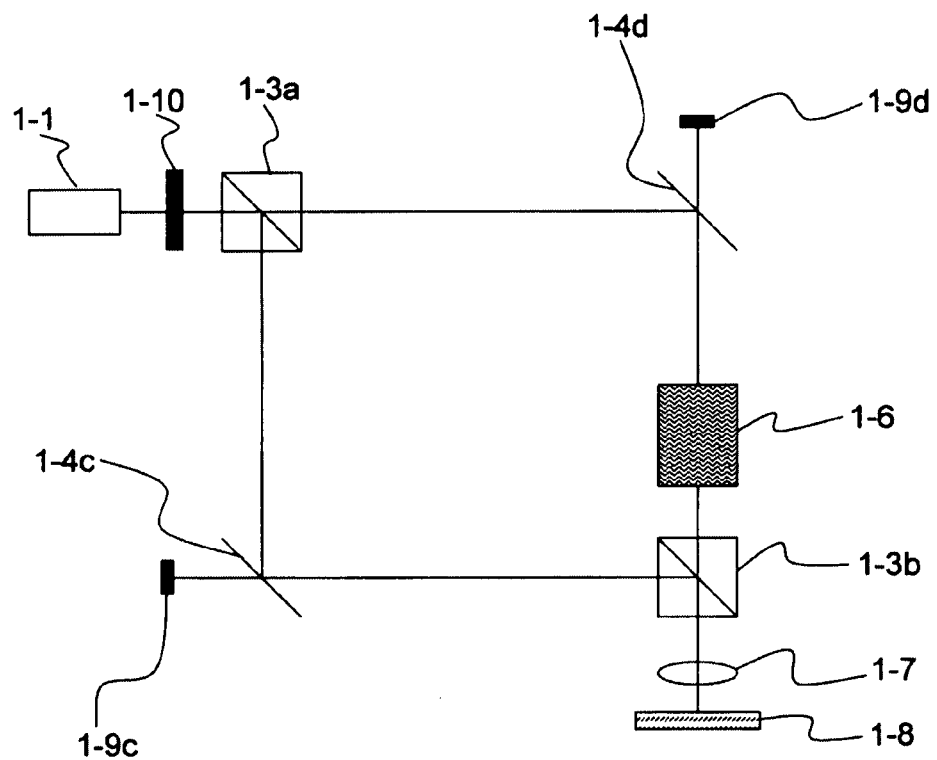
FIG. 4 is a block diagram showing another optical system in the first embodiment of the optical information recording apparatus (optical information reproducing apparatus) according to an embodiment of the present invention.

Moreover, another method may employ an optical system shown in FIG. 4 without using the branching optical systems. Differences in configuration of the optical system from the optical system of FIG. 1 are that the branching optical systems 1-5a, 1-5b are not used and that the total reflection mirrors 1-4a, 1-4b are replaced with half mirrors 1-4c, 1-4d, after which a detector for servo 1-9c and a detector for reproduction signal 1-9d are arranged, respectively.

In this configuration, there is an advantage that all the optical systems can be assembled on the same plane. On the other hand, as a disadvantage, there arises loss of optical energy due to the use of the half mirrors. Accordingly, if recording sensitivity to the optical energy of the recording medium is unfavorable, the recording may be performed. Moreover, if a return light quantity from the recording medium during the data reproduction is low, a sufficient SN ratio may not be obtained. In this case, this optical system is not suitable.

Next, the recording medium used in an embodiment of the present embodiment will be described.

Figure 5:
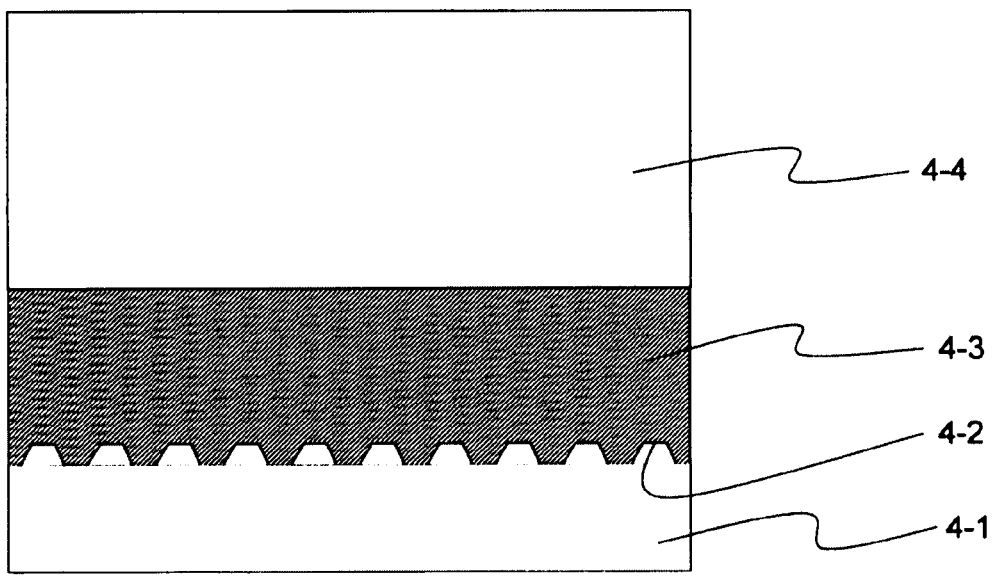
FIG. 5 is a cross-sectional schematic diagram showing a configuration of the recording medium used in the first embodiment of the optical information recording apparatus (optical information reproducing apparatus) according to an embodiment of the present invention.

In FIG. 5, a structure of the recording medium is shown.

The recording medium is composed of a substrate 4-1, a servo information plane 4-2, an information recording layer 4-3, and a light transmitting layer 4-4.

The substrate 4-1 is composed of glass or plastic such as polycarbonate. Embossed pits or guide grooves for retrieving the address information and performing the servo operation are formed on the substrate 4-1. A metallic film of aluminum, silver or the like is provided on the embossed bits guide grooves as a reflective film by a method such as sputtering to form the servo information plane 4-2.

The information recording layer 4-3 is provided on the servo information plane 4-2. The information recording layer 4-3 is formed with a predetermined thickness, for example, by mixing and deaerating acrylic acid ester monomer (p-cumylphenol ethylene oxide-added acrylic acid ester), and urethan bifuctional acrylate oligomer in a ratio of 40:60 (wt. %), bis($\eta$-2,4-cyclopentadien-1-yl)-bis(2,6-difluoro-3-(1H-pyrrol-1-yl)-phenyl)titanium (Irg-784 manufactured and sold by Chiba Specialty Chemicals, hereinafter, referred to as "Irg-784"), which is an organic metallic compound of compounding ratio of 0.8 wt. % to the total weight, and a photopolymerization initiator, and developing the resultant on a substrate in a dark room. If the information recording layer 4-3 and the metallic film initiate a reaction, an inorganic film of, e.g., silicon oxide, silicon nitride or the like inactive to the information recording layer 4-3 may be preferably provided on the metallic film. If the reflected light from the servo information plane 4-2 has an adverse effect, or if the recording material initiates a reaction by the condensing of the light beam for servo on the servo information plane and so on, a structure in which a gap layer of about 20 μm is provided on the metallic film, using UV-cured resin or the like is also possible.

The light transmitting layer 4-4, which is a substrate made of glass or plastic such as polycarbonate, is provided on the information recording layer 4-3. When the light transmitting layer 4-4 and the information recording layer 4-3 initiate a reaction, an inorganic film of e.g., silicon oxide, silicon nitride or the like inactive to the information recording layer 4-3 may be preferably provided on the light transmitting layer 4-4. It is desirable that the light transmitting layer 4-4 is composed of a material not only having a small optical absorption but also having a small optical anisotropy to prevent the polarized state from changing as much as possible.

(Optical Information Recording Method)

The optical information recording method of an embodiment of the present invention is a method of focusing one light beam for recording within a recording medium and producing local refractive index change within a recording material by photochemical reaction and/or thermochemical reaction to thereby record information.

Figure 6:
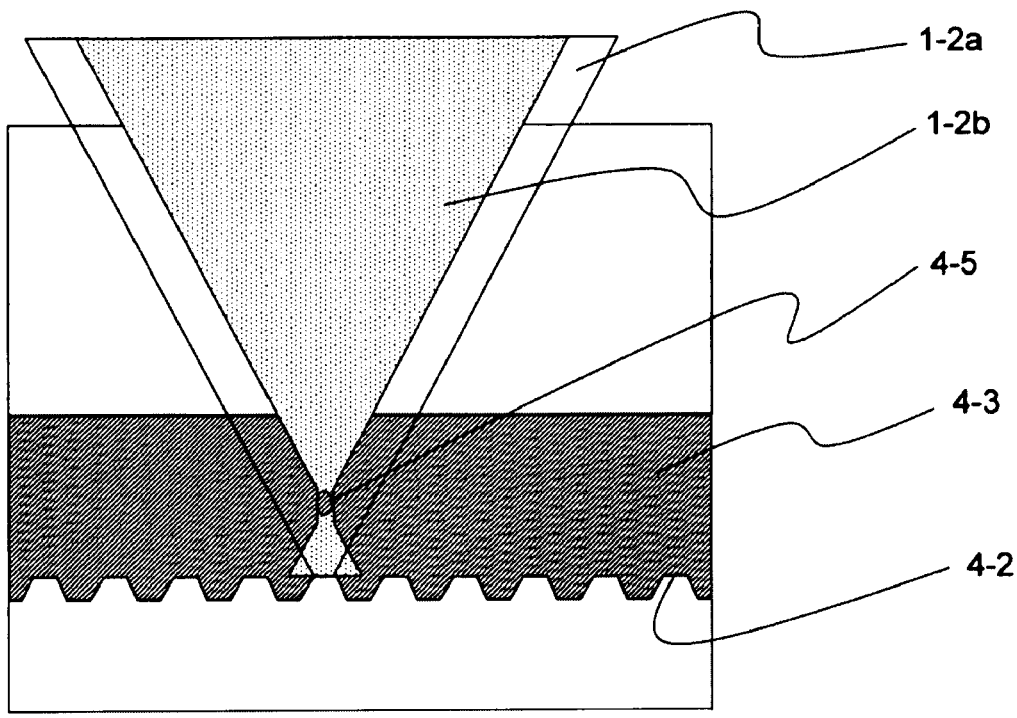
FIG. 6 is an explanatory diagram showing how a light beam is condensed in the recording medium of FIG. 5.

FIG. 6 shows the light beam for servo and the light beam for recording/reproduction within the recording medium during the recording and the reproduction. Hereinafter, referring to FIGS. 1 and 6, the procedures of the optical information recording/reproducing methods will be described.

(S11) The light beam for servo 1-2a goes through the servo-side optical system of FIG. 1, and is collected in the plane (servo information plane) 4-2 on which address information and/or servo information is recorded in the embossed pits. Subsequently, the light reflected from the servo information plane 4-2 is reflected in the polarization beam splitter 1-3b, and then enters the branching optical system 1-5a again. This light beam outgoes in a state deviated from the original optical axis within this optical system, and is received by the detector for servo 1-9a as the servo detector so that the address information and/or servo information is read.

(S12) Based on the read address information and/or servo information, the focusing and the positioning control in a lateral direction (disc horizontal direction) of the light beam for recording/reproduction 1-2b are performed by the drive of the objective lens 1-7.

(S13) The light beam for recording/reproduction 1-2b is focused in a predetermined position different in the depth direction from that of the servo information plane 4-2 within the information recording layer 4-3. The setting of the focal depth is performed by the control of the focal depth switching optical system 1-6. For the focal depth switching method, while there are several publicly-known methods, the simplest method is to change a synthetic focal distance by changing distances of two lenses. When a focal position in the depth direction is changed, spherical aberration correction may be necessary in some extents. In the case of requiring the spherical aberration corrosion, a mechanism for correcting the aberration is added in an optical path of the light beam for recording/reproduction 1-2b. Since the light beam for servo 1-2a and the light beam for recording/reproduction 1-2b are put into the relation of orthogonal polarization to each other by the polarization beam splitter 1-3a, the two light beams do not interfere with each other, although they overlap within the information recording layer 4-3. Accordingly, the influence of unnecessary interference fringes can be eliminated.

(S14) The vicinity of a focal point of the light beam for recording/reproduction 1-2b becomes at high temperature in combination with the optical absorption of the recording material of the information recording layer 4-3, so that a microbubble 4-5 is formed. The microbubble 4-5 is a minute cavity space formed in the recording material. Accordingly, the interior of the microbubble 4-5 is considered to be in a state where a refractive index is nearly 1, which produces a refractive index difference from that of the recording material around it (refractive index, e.g., 1.5 to 1.6). This is a partial refractive index change and is fixed in the information recording layer 4-3. Depending on the presence or absence of this microbubble 4-5, the information is recorded. In the information recording layer 4-3, the microbubbles 4-5 are formed in a predetermined pattern in a horizontal direction in the same position in the depth direction to form the recording plane.

Figure 7:
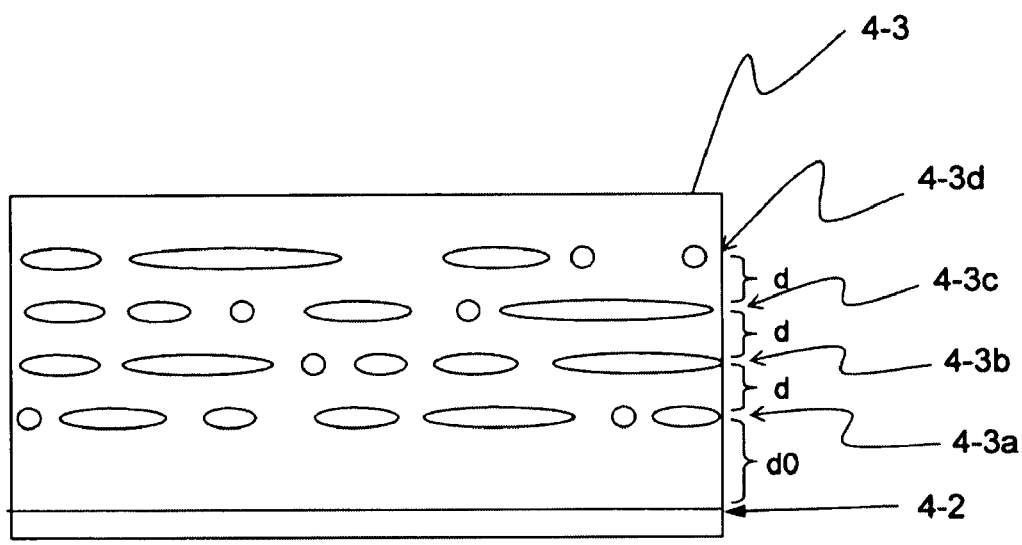
FIG. 7 is a cross-sectional diagram showing a forming state of recording planes in the recording medium of FIG. 5.

FIG. 7 is a schematic diagram of a state where the recording planes are formed in layers in the depth direction to record information within the information recording layer 4-3. The diagram shows a state where four types of the focal depth of the light beam for recording/reproduction 1-2b are set, and a state where four layers are recorded. That is, recording planes 4-3a, 4-3b, 4-3c, 4-3d are provided alongside at predetermined distances d in the depth direction. At this time, the distance d0 between the recording plane 4-3a and the servo information plane 4-2 is set to be not less than the above-described distance d. This is to reduce the influence of crosstalk from the servo information plane during the data reproduction, because a reflected light volume from the reflective film of the servo information plane 4-2 is larger at least by single or more figures than a reflected light volume from the recording pits of each of the recording planes.

(Optical Information Reproducing Method)

(S21) In the data reproduction, the light beam for servo 1-2a goes through the servo-side optical system of FIG. 1, and is collected in the servo information plane 4-2. Subsequently, the light reflected from the servo information plane 4-2 is reflected in the polarization beam splitter 1-3b, and then enters the branching optical system 1-5a again. This light beam outgoes in a state deviated from the original optical axis within this optical system, and is received by the detector for servo 1-9a as the servo detector so that the address information and/or servo information is read.

(S22) Based on the read address information and/or servo information, the focusing and the positioning control in the lateral direction (disc horizontal direction) of the light beam for recording/reproduction 1-2b are performed by the objective lens 1-7 driving.

(S23) The light beam for recording/reproduction 1-2b is focused in a position different in the depth direction from that of the servo information plane 4-2 within the information recording layer 4-3 as in the optical information recording method.

(S24) The reflected light from the recording mark (minute refractive index change region) including the microbubble 4-5 within the recording material passes through the objective lens 1-7, the polarization beam splitter 1-3b and the focal depth switching optical system 1-6, and then enters the branching optical system 1-5b. This reflected light exits in a state deviated from the original optical axis within the branching optical system 1-5b, and is received by the detector for signal 1-9b as the reproduction detector to reproduce the information.

Second Embodiment

A second embodiment of an optical information recording method and an optical information reproducing method according to an embodiment of the present invention will be described based on an optical information apparatus and an optical information reproducing apparatus according to an embodiment of the present invention. Here, while an optical information recording and reproducing apparatus combining respective requirements of both the optical information recording apparatus and the optical information reproducing apparatus will be described, the optical information recording and reproducing apparatus has a constitution preferable for providing the optical information recording method and the optical information reproducing method of an embodiment of the present invention.

Figure 8:
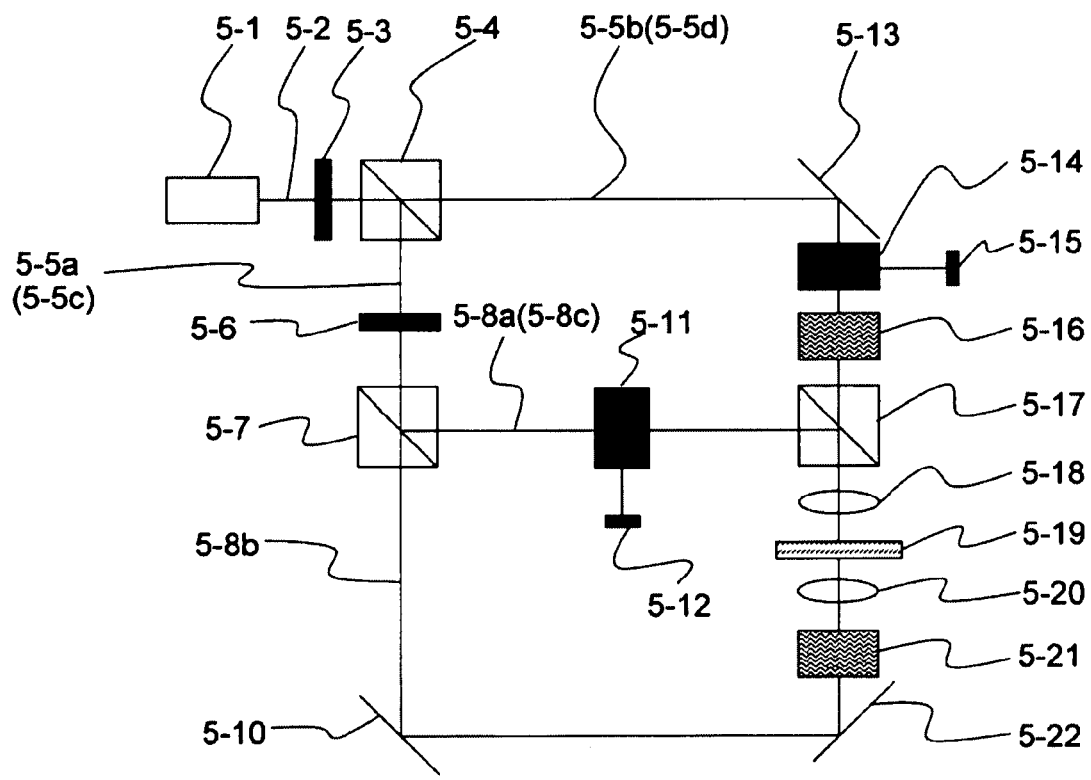
FIG. 8 is a block diagram showing an optical system in a second embodiment of the optical information recording apparatus (optical information reproducing apparatus) according to an embodiment of the present invention.

FIG. 8 shows an optical system in the second embodiment of the optical information recording and reproducing apparatus in an embodiment of the present invention. In the figure, only a main optical block is illustrated.

In FIG. 8, the reference character 5-1 denotes a laser light source, and in Example 2 described later, a semiconductor laser apparatus having a wavelength of 405 nm is used. In the present embodiment, since two light beams are allowed to interfere with each other, a single mode by an external resonator(not shown) is employed. Hereinafter, the operations during the recording and the reproduction will be described separately.

(1) At the Recording

A light beam 5-2 emitted from the laser light source 5-1 is separated by a polarization beam splitter 5-4 as one embodiment of the beam divider into S polarized light and P polarized light, which advance separately in two directions as a light beam 5-5a and a light beam 5-5b, respectively. Here, the light beam 5-5b is used as a first light beam for recording. Reference character 5-3 denotes a ½ wavelength plate as one embodiment of the intensity adjusting unit, which adjusts an intensity ratio between the light beam 5-5a and the first light beam for recording 5-5b.

The light beam 5-5b is further divided into the light beam 5-8a for servo and the light beam 5-8b for second recording by the polarization beam splitter 5-7. The reference character 5-6 denotes a ½ wavelength plate which adjusts an intensity ratio between the servo light beam 5-8a and the second recording light beam 5-8b.

(Servo-Side Optical System)

A light beam for servo 5-8a goes through a servo-side optical system as in the first embodiment. That is, the light beam for servo 5-8a passes through a branching optical system 5-11, which is the same as the branching optical system in the first embodiment, and passes through a polarization beam splitter 5-17 and an objective lens 5-18, and is then collected in a servo information plane of a recording medium 5-19.

The light reflected from the servo information plane is reflected at the polarization beam splitter 5-17, and then enters the branching optical system 5-11 again. This light beam outgoes in a state deviated from the original optical axis within this branching optical system 5-11, and is received by a detector for servo 5-12.

(Recording/Reproduction-Side Optical System)

The first light beam for recording 5-5b is reflected by a total reflection mirror 5-13, passes through a branching optical system 5-14, and then passes through a focal depth switching optical system 5-16. Thereafter, it passes through the polarization beam splitter 5-17 and the objective lens 5-18, and then is focused in a predetermined depth position different from that of the servo information plane within the recording medium 5-19.

A second light beam for recording 5-8b is reflected at total reflection mirrors 5-10, 5-22, and passes through a focal depth switching optical system 5-21. Thereafter, it is focused by an objective lens 5-20 in the same depth position as that of the first light beam for recording 5-5b within the recording medium 5-19.

Minute interference fringes are formed in a region where these two light beams (first light beams for recording 5-5b and second light beam for recording 5-8b) are condensed, and minute refractive index modulation occurs within the recording material to generate a recording mark.

(2) At the Reproduction

The light beam 5-2 emitted from the laser light source 5-1 is separated by the polarization beam splitter 5-4 into the S polarized light and the P polarized light, which advance separately in two directions as a light beam 5-5c and a light beam 5-5d, respectively. Here, the light beam 5-5d is used as a light beam for reproduction. Reference character 5-3 denotes a ½ wavelength plate as one embodiment of the intensity adjusting unit, which adjusts an intensity ratio between the light beam 5-5c and the light beam for reproduction 5-5d.

The light beam 5-5c is adjusted by a ½ wavelength plate 5-6 so as to be only reflected component (either P polarized light or S polarized light) in a polarization beam splitter 5-7, and is reflected in the polarization beam splitter 5-7 to be a light beam for servo 5-8c.

(Servo-Side Optical System)

The light beam for servo 5-8c passes through the branching optical system 5-11, and passes through the polarization beam splitter 5-17 and the objective lens 5-18, and is then collected onto the servo information plane of the recording medium 5-19.

The light reflected from the servo information plane is reflected in the polarization beam splitter 5-17, and then enters the branching optical system 5-11 again. This light beam exits in a state deviated from the original optical axis within this optical system 5-11, and is received by the detector for servo 5-12.

(Recording/Reproduction-Side Optical System)

The light beam for reproduction 5-5d is reflected by the total reflection mirror 5-13, passes through the branching optical system 5-14, and then passes through the focal depth switching optical system 5-16. Thereafter, it passes through the polarization beam splitter 5-17 and the objective lens 5-18, and then is collected in a predetermined depth position different from that of the servo information plane within the recording medium 5-19.

Subsequently, diffracted light (reflected light) from a recording mark (minute refractive-index modulation region) passes through the objective lens 5-18, the polarization beam splitter 5-17, and the focal depth switching optical system 5-16, and then enters the branching optical system 5-14. This reflected light exits in a state deviated from the original optical axis within this branching optical system 5-14, and is received by the detector for signal 5-15 as a reproduction detector.

The light beam for servo 5-8a and the two light beams for recording (first light beam for recording 5-5b, second light beam for recording 5-8b), the light beam for servo 5-8c and the light beam for reproduction 5-5d are preferably arranged coaxially.

Next, the recording medium in use for an embodiment of the present embodiment will be described.

Figure 9:
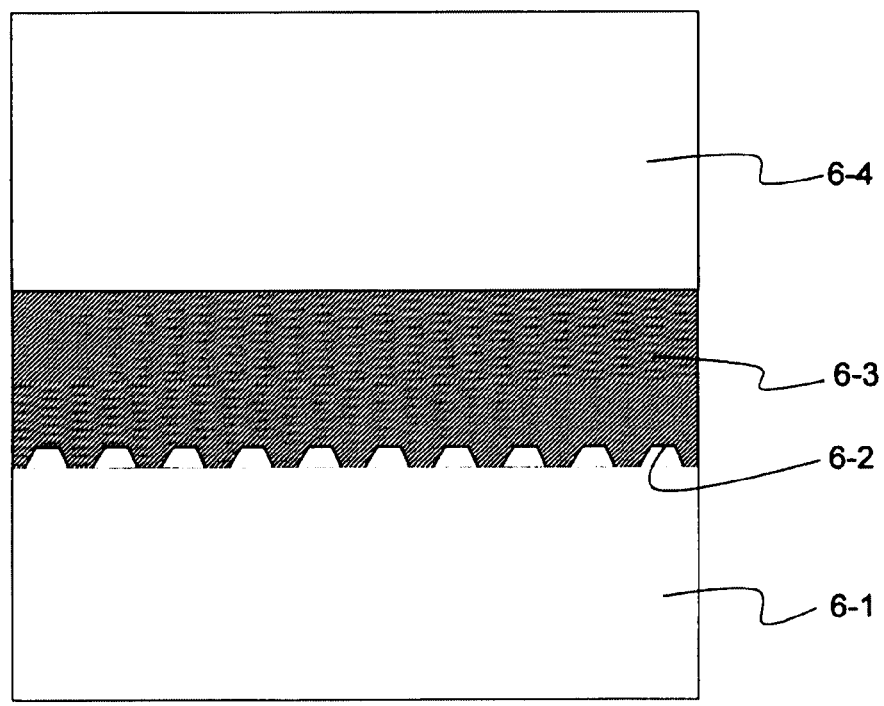
FIG. 9 is a cross-sectional schematic diagram showing a configuration of a recording medium used in the second embodiment of the optical information recording apparatus (optical information reproducing apparatus) according to an embodiment of the present invention.

FIG. 9 shows a structure of the recording medium.

The recording medium is composed of a substrate 6-1, a servo information plane 6-2, a hologram recording layer 6-3, and a light transmitting layer 6-4.

The substrate 6-1 is composed of glass or plastic such as polycarbonate. Embossed pits or guide grooves for reading address information and performing the servo operation are formed on the substrate 6-1. A metallic film of aluminum, silver or the like is formed as a half reflective film by a method such as sputtering so as to form the servo information plane 6-2. This half reflective film reflects radiated light in a certain ratio, and transmits the same in a certain ratio. This allows the light beam for servo to be reflected at the servo information plane 6-2, and the second light beam for recording 5-8b to transmit through the servo information plane 6-2.

The hologram recording layer 6-3 is formed on the servo information plane 6-2. If the hologram recording layer 6-3 and the above-described half reflective film (metallic film) initiate a reaction, an inorganic film of e.g., silicon oxide, silicon nitride or the like inactive to the hologram recording layer 6-3 may be preferably provided. If the reflected light from the servo information plane 6-2 has an adverse effect, or if the recording material initiates a reaction by the condensing of the light beam for servo on the servo information plane, and so on, a structure in which a gap layer of about 20 μm is provided on the half reflective film, using UV-cured resin or the like is also possible.

The light transmitting layer 6-4, which is a substrate made of glass or plastic such as polycarbonate, is formed on the information recording layer 6-3. In this case, if the light transmitting layer 6-4 and the above-described information recording layer 6-3 initiate a reaction, an inorganic film of e.g., silicon oxide, silicon nitride inactive to the information recording layer 6-3 may be preferably provided. Moreover, it is desirable that the light transmitting layer 6-4 is made of a material not only having a small optical absorption but also having a small optical anisotropy so as to prevent the polarized state from changing as much as possible.

(Optical Information Recording Method)

The optical information recording method of an embodiment of present invention is a method of focusing the opposed two light beams for recording in the same depth position of the recording medium to thereby record information with interference fringes used as a minute hologram within the recording medium.

FIG. 10 shows the light beam for servo and the light beams for recording within the recording medium during the recording. Hereinafter, referring to FIGS. 8 and 10, the procedure of the optical information recording method will be described.

(S31) The light beam for servo 5-8a goes through the servo-side optical system of FIG. 8, and is collected in the plane (servo information plane) 6-2 on which address information and/or servo information is recorded in the embossed pits. Subsequently, the light reflected from the servo information plane 6-2 is reflected in the polarization beam splitter 5-17, and then enters the branching optical system 5-11 again. This light beam outgoes in a state deviated from the original optical axis within this branching optical system 5-11, and is received by the detector for servo 5-12 so that the address information and/or servo information is read.

(S32) Based on the read address information and/or servo information, the focusing and the positioning control in a lateral direction (disc horizontal direction) of the first light beam for recording 5-5b and the second light beam for recording 5-8b are performed by the objective lenses 5-18, 5-20 driving.

(S33) The first light beam for recording 5-5b and the second light beam for recording 5-8b are focused in a predetermined position different in the depth direction from, and identical in the horizontal direction to, that of the servo information plane 6-2 within the hologram recording layer 6-3. The setting of the focal depth is performed by the control of the focal depth switching optical systems 5-16, 5-21. When a focal position in the depth direction is changed, spherical aberration correction may be necessary in some extents. Using the spherical aberration correction, a mechanism for correcting the aberration is added in each of optical paths of the first light beam for recording 5-5b and the second light beam for recording 5-8b. Since the light beam for servo 5-8a and the light beams for recording (the first light beam for recording 5-5b and the second light beam for recording 5-8b) are put into the relation of orthogonal polarization to each other by the polarization beam splitters 5-4, 5-7, the light beam for servo 5-8a and the light beams for recording do not interfere with each other, although they overlap within the hologram recording layer 6-3. Accordingly, the influence of unnecessary interference fringes can be eliminated.

(S34) In the vicinity of a focal point of the first light beam for recording 5-5b and the second light beam for recording 5-8b, both the light beams interfere with each other and the interference fringes are recorded as a refractive index distribution 6-5 in the hologram recording layer 6-3. Depending on the presence or absence of this refractive index distribution 6-5, the information is recorded. In the hologram recording layer 6-3, the refractive index distributions 6-5 are formed in a predetermined pattern in the horizontal direction in the same position in the depth direction to form the recording plane. A plurality of kinds of focal depths of the first light beam for recording 5-5b and the second light beam for recording 5-8b are set as needed to thereby form the recording planes in layers in the depth direction for recording.

(Optical Information Reproducing Method)

Figure 11:
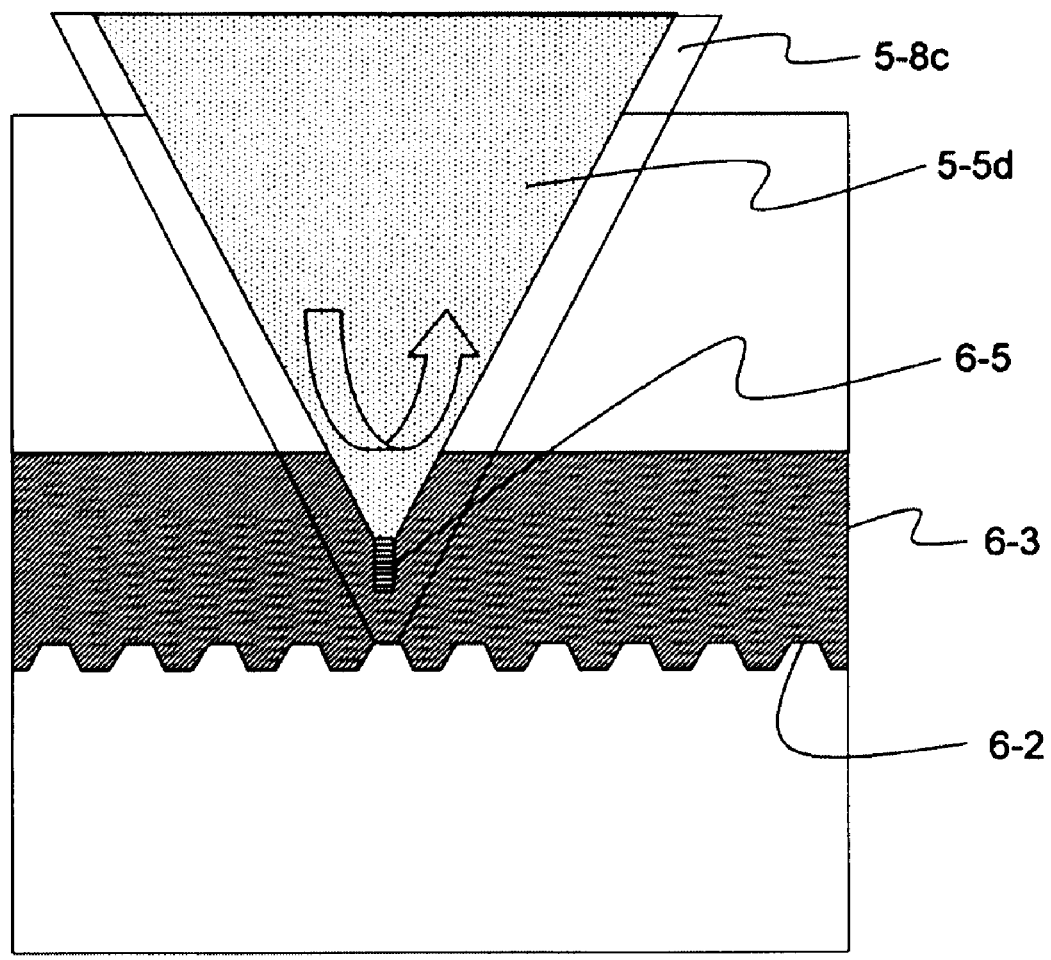
FIG. 11 is an explanatory diagram showing how a light beam during reproduction is condensed in the recording medium of FIG. 9.

FIG. 11 shows the light beam for servo and the light beam for recording within the recording medium during the reproduction. Hereinafter, referring to FIGS. 8 and 11, the procedure of the optical information reproducing method will be described.

(S41) In the data reproduction, the light beam for servo 5-8c goes through the servo-side optical system of FIG. 8, and is collected in the servo information plane 6-2. Subsequently, the light reflected from the servo information plane 6-2 is reflected in the polarization beam splitter 5-17, and then enters the branching optical system 5-11 again. This light beam outgoes in a state deviated from the original optical axis within this branching optical system 5-11, and is received by the detector for servo 5-12, so that the address information and/or servo information is read.

(S42) Based on the read address information and/or servo information, the focusing and the positioning control in the lateral direction (disc horizontal direction) of the light beam for reproduction 5-5d are performed by the objective lens 5-18 driving.

(S43) The light beam for reproduction 5-5d is focused in a position different in the depth direction from that of the servo information plane 6-2 within the hologram recording layer 6-3 as in the optical information recording method.

(S44) The reflected light (diffracted light) from the recording mark (interference fringes) including the refractive index distribution 6-5 within the recording material passes through the objective lens 5-18, the polarization beam splitter 5-17 and the focal depth switching optical system 5-16, and then enters the branching optical system 5-14. This reflected light outgoes in a state deviated from the original optical axis within the branching optical system 5-14, and is received by the detector for signal 5-15 as the reproduction detector to reproduce the information.

EXAMPLES

Hereinafter, examples of the present invention will be described.

Example 1

The optical information recording and reproducing apparatus of an embodiment of the present invention shown in FIG. 1 was used to record information on the recording medium of FIG. 5 by the optical information recording method of an embodiment of the present invention described in the first embodiment.

The conditions at this time are as follows.

(1) Optical Information Recording and Reproducing Apparatus (FIG. 1)

The laser light source 1-1: Semiconductor laser of a wavelength 405 nm

The objective lens 1-7: Numeric aperture 0.6

(2) Recording Medium (FIG. 5)

The Information recording layer 4-3:

The information recording layer 4-3 was formed with a thickness of 0.25 μm by mixing and deaerating acrylic acid ester monomer (p-cumylphenol ethylene oxide-added acrylic acid ester), and urethan bifuctional acrylate oligomer in a ratio of 40:60 (wt. %), bis(η-2,4-cyclopentadien-1-yl)-bis(2,6-difluoro-3-(1H-pyrrol-1-yl)-phenyl)titanium (Chiba Specialty Chemicals Irg-784), which is an organic metallic compound of compounding ratio of 0.8 wt. % to the total weight, and a photopolymerization initiator, and developing the resultant on the substrate 4-1 in a dark room.

The light transmitting layer 4-4: Thickness 0.35 μm

The fabric as shown in FIG. 5 was irradiated with a high-pressure mercury lamp (a power density 30 mW/cm² in a wavelength 365 nm) for 60 minutes to be light-cured (initiated) to form the recording medium.

(3) Optical Information Recording Conditions

The optical information recording was performed by the following procedure and conditions.

(S51) The light beam for servo 1-2a was collected in the servo information plane 4-2 through the servo-side optical system of FIG. 1. The incident power at this time was set to 1 mW, which was the lowest of the irradiated light beams onto the recording medium. Subsequently, the address information and/or the servo information was read from the reflected light by the detector for servo 1-9a.

(S52) Based on the read address information and/or servo information, the focusing and the positioning control in a lateral direction (disc horizontal direction) of the light beam for recording/reproduction 1-2b were performed by the objective lens 1-7 driving.

(S53) The light beam for recording/reproduction 1-2b was focused in the predetermined position different in the depth direction from that of the servo information plane 4-2 within the information recording layer 4-3. The incident power at this time was 50 mW.

(S54) In the vicinity of the focal point of the light beam for recording/reproduction 1-2b, the microbubble 4-5 was formed. In the present example, the spread in a lateral direction of the microbubble 4-5 was 0.7 μm, and the spread in a longitudinal direction thereof was 2 μm. The depth position of the similar recording was varied in four steps to form the four recording planes in layers in the depth direction as shown in FIG. 7. The distance d between the recording planes at this time was 40 μm, and the distance d0 between the recording plane 4-3a and the servo information plane 4-2 was set to 70 μm.

The above-described conditions allowed secure positioning control of the light beam to be performed, resulting in stable recording. Moreover, after performing the recording, the reproduction of the recorded information was performed by the same optical information recording and reproducing apparatus. As a result, favorable reproduction was performed without any influence of crosstalk from the servo information plane 4-2.

Example 2

The optical information recording and reproducing apparatus of an embodiment of the present invention shown in FIG. 8 was used to record information on the recording medium of FIG. 9 by the optical information recording method of an embodiment of the present invention described in the second embodiment.

The conditions at this example are as follows.

(1) Optical Information Recording and Reproducing Apparatus (FIG. 8)

The laser light source 5-1: Semiconductor laser of a wavelength 405 nm

The objective lenses 5-18, 5-20: Numeric aperture 0.6

(2) Recording Medium (FIG. 9)

Half reflective film: Ag film (thickness 5 nm) (reflectance 10% of laser light of a wavelength 405 nm, transmittance 80%

The hologram recording layer 6-3 was formed of a publicly-known recording material with a thickness of 0.25 μm.

The light transmitting layer 4-4: Thickness 0.35 μm (3) Optical Information Recording Conditions The optical information recording was performed by the following procedure and conditions.

(S61) The light beam for servo 5-8a was condensed in the servo information plane 6-2 through the servo-side optical system of FIG. 8. The incident power at this time was set to 1 mW, which was the lowest of the irradiated light beams onto the recording medium. Subsequently, the address information and/or the servo information was read from the reflected light by the detector for servo 5-12.

(S62) Based on the read address information and/or servo information, the focusing and the positioning control in a lateral direction (disc horizontal direction) of the first light beam for recording 5-5b and the second light beam for recording 5-8b were performed by the objective lenses 5-18, 5-20 driving.

(S63) The first light beam for recording 5-5b and the second light beam for recording 5-8b were focused in the predetermined position different in the depth direction from that of the servo information plane 6-2 within the hologram recording layer 6-3. The incident power at this time was 5 mW.

(S64) In the vicinity of the focal point of the first light beam for recording 5-5b and the second light beam for recording 5-8b, the refractive index distribution 6-5 was formed. The depth position of the similar recording was varied in four steps to form the four recording planes in layers in the depth direction. The distance d between the recording planes at this time was 40 μm, and the distance d0 between the servo information plane 6-2 and the recording plane adjacent to the servo information plane 6-2 was set to 70 μm.

The above-described conditions allowed secure positioning control of the light beam to be performed, resulting in stable recording. Moreover, after performing the recording, the reproduction of the recorded information was performed by the same optical information recording and reproducing apparatus. As a result, favorable reproduction could be performed without any influence of the reflected light from the servo information plane 6-2.

According to embodiments of the present invention, secure positioning control of the light beam can be performed without complicating the structures of the optical system and the recording medium, thereby resulting in stable recording. That is, by dividing the light beam from the one laser light source to obtain the light beams for servo and for recording, the optical system can be assembled at low cost as compared with a method of three-dimensional volume recording with a light source for servo used as a separate light source. Moreover, as compared with a case where lasers of different wavelengths are used as the respective light sources, lens design is easy.

Moreover, according to embodiment of the present invention, by making the polarization of the light beam for servo and the light beam for recording perpendicular to each other, the influence of unnecessary interference fringes can be avoided within the recording medium even if the structure is employed where the light beam for servo and the light beam for recording are arranged coaxially, and overlap each other.

According to embodiments of the present invention, even in the bit-by-bit recording, since the light beams for servo and for recording are obtained by dividing the light beam from the one laser light source, the wavelengths of the light beams for servo and for recording are the same, and thus, the light beams can be controlled at a predetermined positioning accuracy.

According to embodiments of the present invention, in the case of layered recording, by making the distance between the servo information plane and the recording plane closest to the servo information plane (adjacent recording plane A) larger than the distance between the recording plane A and the recording plane closest to the recording plane A (adjacent recording plane B), the influence of diffraction/reflection of the light beam for recording from the servo information plane can be avoided, and even if there is damage of the recording material by the condensing of the servo light, the influence on the data recording region can be avoided.

Moreover, according to embodiments of the present invention, by making the intensity of the light beam for servo the lowest, unnecessary writing in the recording medium by the servo light can be avoided.

Furthermore, according to embodiments of the present invention, the address information and/or servo information can be read by the known method.

According to embodiments of the present invention, since the first light beam is passed without changing the polarized state, and the reflected light of the incident first light beam is emitted in the state deviated from the optical axis of the first light beam, the optical system can be made compact.

According to embodiments of the present invention, the secure positioning control of the light beam can be performed without complicating the structures of the optical system and the recording medium, resulting in stable reproduction. That is, by dividing the light beam from the one laser light source to obtain the light beams for servo and for reproduction, the optical system can be assembled at low cost as compared with the method of three-dimensional volume recording with the light source for servo used as a separate light source. Moreover, as compared with a case where lasers of different wavelengths are used as the respective light sources, lens design is easy.

It should be understood by those skilled in the art that various modifications, combinations, sub-combinations and alternations may occur depending on design requirements and other factors insofar as they are within the scope of the appended claims or equivalents thereof.

What is claimed is:

1. An optical information recording method of recording information three-dimensionally by irradiating a laser light beam onto a recording medium having a servo information plane on which address information and/or servo information is recorded, the method comprising:
    dividing a laser light beam from one laser light source into two or more laser light beams, the laser light beam including a first light beam for reading the address information and/or the servo information, and a second light beam for recording information onto the recording medium;
    irradiating the first light beam onto the servo information plane to read the address information and/or the servo information from reflected light of the first light beam to read the address information and/or servo information in which optical axes of the first light beam and the second light beam are arranged coaxially; and
    irradiating the second light beam based on the read address information and/or servo information to be focused onto a position in a depth direction perpendicular to a horizontal direction of the recording medium to perform the recording, wherein
    the recording is performed bit-by-bit, and
    a recording plane is formed in layered in the depth direction of the recording medium to record the information three-dimensionally, the recording plane being a plane in the same depth position of the recording medium.

2. The optical information recording method according to claim 1, wherein polarized states of the first light beam and second light beam are perpendicular to each other.

3. The optical information recording method according to claim 1, wherein a distance between the servo information plane and a first recording plane adjacent to the servo information plane is not less than a distance between the first recording plane and a second recording plane adjacent to the first recording plane.

4. The optical information recording method according to claim 1, wherein the first light beam has an intensity of a lowest of the divided laser light beams.

5. The optical information recording method according to claim 1, wherein the address information and/or servo information is recorded in embossed pits.

6. An optical information recording apparatus that records information three-dimensionally by irradiating a laser light beam onto a recording medium having a servo information plane on which address information and/or servo information is recorded, the apparatus comprising:
    one laser light source;
    a beam divider for dividing a laser light beam from the laser light source into two or more laser light beams, the laser light beams including a first light beam for retrieving the address information and/or the servo information, and a second light beam for recording information within the recording medium;
    a focal depth switching unit for switching a focal depth of the second light beam;
    a beam coaxially-arranging unit for arranging optical axes of the first light beam and the second light beam coaxially;
    an optical system to guide the first light beam and second light beam with the optical axes arranged coaxially to the recording medium; and
    a servo detector to read the address information and/or servo information from reflected light of the first light beam, wherein
    the servo detector reads the address information and/or servo information from the reflected light of the first light beam irradiated onto the servo information plane, and the focal depth switching unit switches the focal depth of the second light beam based on the read address information and/or servo information, and subsequently, the second light beam with the focal depth switched is irradiated so as to be focused onto a position in a depth direction perpendicular to a horizontal direction of the recording medium to perform the recording,
    the recording is performed bit-by-bit, and
    a recording plane is formed in layered in the depth direction of the recording medium to record the information three-dimensionally, the recording plane being a plane in the same depth position of the recording medium.

7. The optical information recording apparatus according to claim 6, wherein the beam divider is a polarization beam splitter that divides the light beam so that polarized states of the first light beam and the second light beam are perpendicular to each other.

8. The optical information recording apparatus according to claim 7, wherein the recording medium has the servo information plane on which the address information and/or servo information is recorded in embossed pits.

9. The optical information recording apparatus according to claim 6, wherein a distance between the servo information plane and a first recording plane adjacent to the servo information plane is not less than a distance between the first recording plane and a second recording plane adjacent to the first recording plane.

10. The optical information recording apparatus according to claim 6, further comprising a servo branching optical system within an optical path of the first light beam, wherein the servo branching optical system passes the first light beam without changing the polarized state, and emits reflected light of the incident first light beam in a state deviated from an optical axis of the first light beam.

11. The optical information recording apparatus according to claim 6, further comprising an intensity adjusting unit for adjusting the first light beam to the lowest intensity of the divided laser light beams.

12. An optical information reproducing method of reproducing recorded information by irradiating a laser light beam onto a recording medium on which the information is recorded three-dimensionally, the method comprising:
   dividing a laser light beam from one laser light source into two or more laser light beams, the laser light beams including a first light beam for reading address information and/or servo information, and a third light beam for reproducing the information within the recording medium;
   then irradiating the first light beam onto the servo information plane in which optical axes of the first light beam and third light beam are arranged coaxially to read the address information and/or the servo information from reflected light of the first light beam; and
   irradiating the third light beam based on the read address information and/or servo information so as to be focused onto a predetermined position in a horizontal direction and in a depth direction of the recording medium to perform the reproduction of the information from reflected light of the third light beam, wherein
   the recording is performed bit-by-bit.

13. An optical information reproducing apparatus which reproduces recorded information by irradiating a laser light beam onto a recording medium on which the information is recorded three-dimensionally, the apparatus comprising:
   one laser light source;
   a beam divider for dividing a laser light beam from the laser light source into two or more laser light beams, the laser light beams including a first light beam for retrieving address information and/or servo information, and a third light beam for reproducing the information within the recording medium;
   a focal depth switching unit for switching a focal depth of the third light beam;
   a beam coaxially-arranging unit for arranging optical axes of the first light beam and the third light beam coaxially;
   an optical system to guide the first light beam and third light beam with the optical axes arranged coaxially to the recording medium;
   a servo detector to read the address information and/or servo information from reflected light of the first light beam; and
   a reproduction detector to reproduce the information from reflected light of the third light beam, wherein
   the servo detector reads the address information and/or servo information from the reflected light of the first light beam irradiated onto the servo information plane, and the focal depth switching unit switches the focal depth of the third light beam based on the read address information and/or servo information, and subsequently, the third light beam with the focal depth switched is irradiated so as to be focused onto a predetermined position in a horizontal direction and in a depth direction of the recording medium, whereby the reproduction detector reproduces the information from the reflected light of the third light beam, and
   the recording is performed bit-by-bit.

\* \* \* \* \*